US006487317B1

(12) United States Patent
Small

(10) Patent No.: US 6,487,317 B1
(45) Date of Patent: Nov. 26, 2002

(54) CONJUGATE-CHANNEL COMPRESSION OF IMAGES TO BE MULTITONED

(75) Inventor: Jeffrey Alan Small, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1231 days.

(21) Appl. No.: 08/587,195

(22) Filed: Jan. 16, 1996

(51) Int. Cl.[7] .............................. G06K 9/46; G06K 9/32
(52) U.S. Cl. ....................................... 382/240; 382/300
(58) Field of Search ................................. 382/232, 234, 382/240, 248, 300; 358/429, 426; 348/437, 438, 388, 389, 398, 384

(56) References Cited

U.S. PATENT DOCUMENTS 5,048,111 A * 9/1991 Jones et al. .................. 382/248
5,289,548 A   2/1994 Wilson et al. ................ 382/56
5,432,870 A   7/1995 Schwartz ..................... 382/232

* cited by examiner

Primary Examiner—Wenpeng Chen
(74) Attorney, Agent, or Firm—Norman Rushefsky

(57) ABSTRACT

Image reconstruction is provided by sending low frequency image information via a first transmission channel and high frequency edge information via a second channel. This provides the needed high frequency information which exists in the vicinity of edges, but not the high frequency information which exists in other areas of the image. A process for the compression and transmission of original images containing both low frequency information and high frequency includes the steps of compressing the low frequency information, transmitting the compressed low frequency information, multitoning the low frequency information to form a multitoned reconstruction, multitoning the original image to form a multitoned original, calculating a residual signal as the difference between the multitoned original and the multitoned reconstruction, and transmitting the residual signal.

10 Claims, 6 Drawing Sheets if ( ($X_{n-1,m-1} =0$)&($X_{n-1,m} =0$)&($X_{n-1,m+1} =0$)&($X_{n,m-1} =0$)&
($X_{n,m+1}=0$)&($X_{n+1,m-1} =0$)&($X_{n+1,m} =0$)&($X_{n+1,m+1} =0$) )
then $Y_{n,m} =0$
else $Y_{n,m} = X_{n,m}$

CONJUGATE-CHANNEL COMPRESSION OF IMAGES TO BE MULTITONED

BACKGROUND OF THE INVENTION

1. Technical Field

This invention relates generally to the transmission of images with two channels, and particularly of images to be multitoned.

2. Background Art

The Joint Photographic Expert Group (JPEG) data compression standard, as described by William B. Pennebaker and Joan L. Mitchell in "JPEG Still Image Compression Standards", Van Nostrand Reinhold of NY, 1993, is a commonly used transform-based process of image compression which is easily tailored to the frequency-domain response of the human visual system.

U.S. Pat. No. 5,289,548, which issued to D. L. Wilson et al on Feb. 22, 1994, has shown that the low-frequency portion of an image may be differential pulse code modulated (DPCM) as described by Anil K. Jain in "Fundamentals of Image Processing", Prentice Hall of Englewood Cliffs, N.J., 1989, and then transmitted; and that JPEG may be used to transmit the remaining high-frequency information. This was done to minimize the occurrence of blocking artifacts in radiological images.

U.S. Pat. No. 5,432,870, which issued to E. L. Schwartz on Jul. 11, 1995, has described another process for transmitting an image with two channels, whereby a binary version of the image is transmitted using compression such as a Joint Binary Industry Group (JBIG) standard described by Pennebaker and Mitchell, and a visually masked residual image is transmitted using JPEG. Again, the JPEG channel is used primarily to transmit only high frequency information.

In the case of an image library, it may be desired to browse images at lower resolutions on a soft display (such as a CRT), because a soft display typically cannot display high frequencies anyway. By truncating the higher frequency components of an image within JPEG, the compression performance of JPEG is greatly increased. When a hard copy is desired, such a compressed image could then be printed, but with two deleterious effects. First, because typical hardcopy devices have good high frequency response, the artifacts caused by the prior truncation of high frequencies will be reproduced and thereby become evident. Second, many hardcopy devices require the use of multitoning (such as halftoning), as described by Robert Ulichney in "Digital Halftoning", The MIT Press of Cambridge, Mass., 1987, and as illustrated in FIG. 1 hereof, to produce the illusion of a continuous tone image; and this multitoning may interact with the above-mentioned artifacts, making them even more severe.

The JPEG standard supports a "progressive" mode, whereby a low bit-rate image is encoded by truncating the higher frequency JPEG coefficients. When higher quality is desired, these missing coefficients are then transmitted. This may be done multiple times, until the desired image quality is obtained; but this is a costly process because each JPEG decompression requires significant computation. A complete JPEG decompression must be done each time additional coefficients are transmitted. Thus, if an image were to be transmitted at a low bit-rate for image browsing, and then the high-frequency coefficients were transmitted, multiple JPEG decompressions would need to be done. Although such JPEG decompressions could be optimized for particular groupings of coefficients, this would lack generality.

If an image is compressed by JPEG compression such that its high-frequency components are suppressed, excessive blurring of edges would result in the reconstruction. Further, if the image is to be multitoned after reconstruction, the multitoning will inject large amounts of high frequency noise into the image. These effects will result in indistinct edges (which is undesired) and in a general presence of high frequency noise (which is not too objectionable) throughout the image.

DISCLOSURE OF THE INVENTION

It is an object of the present invention to provide image reconstruction by sending low frequency image information via a first transmission channel and high frequency information via a second channel.

It is another object of the present invention to provide image reconstruction by sending low frequency image information via a first transmission channel and sending the difference between (1) a multitoned original image information and (2) a multitoned low frequency image information via a second channel.

It is still another object of the present invention to provide image reconstruction by sending low frequency image information via a first transmission channel and sending high frequency edge information via a second channel. This provides the needed high frequency information which exists in the vicinity of edges, but not the high frequency information which exists in other areas of the image. Any high frequency information existing in the other regions of the image would be hidden by the multitoning noise, and is therefore not needed to provide a pleasing rendition of the image.

According to a feature of the present invention, a process for the compression and transmission of original images containing both low frequency information and high frequency information includes the steps of compressing the low frequency information; transmitting the compressed low frequency information; multitoning the low frequency information to form a multitoned reconstruction; multitoning the original image to form a multitoned original; calculating a residual signal as the difference between the multitoned original and the multitoned reconstruction; and transmitting the residual signal.

According to a preferred embodiment of the present invention, the step of multitoning the low frequency information to form a multitoned reconstruction includes the step of decompressing the compressed low frequency information. The low frequency information is compressed by lossless or lossy techniques, and the original image and the reconstruction of the compressed low frequency information are multitoned by the same method. The process may further include the step of spatially filtering the residual signal to substantially eliminate isolated non-zero pixels, thereby reducing entropy of the residual signal, as described by Majid Rabbani and Paul W. Jones in "Digital Image Compression Techniques", SPIE Optical Engineering Press of Bellingham, Wash., 1991.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
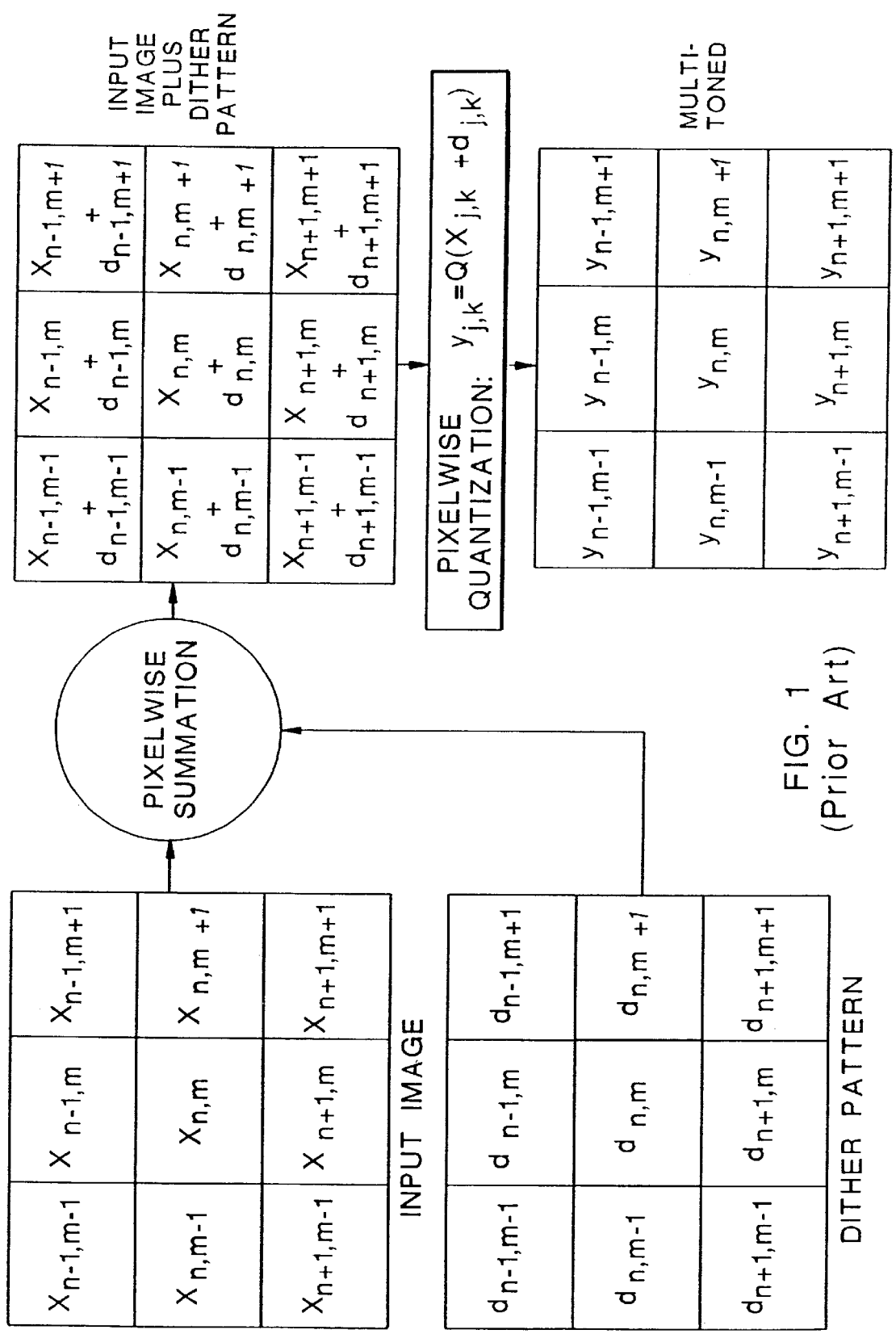
FIG. 1 is a schematic illustration of a known multitoning process.
Figure 2:
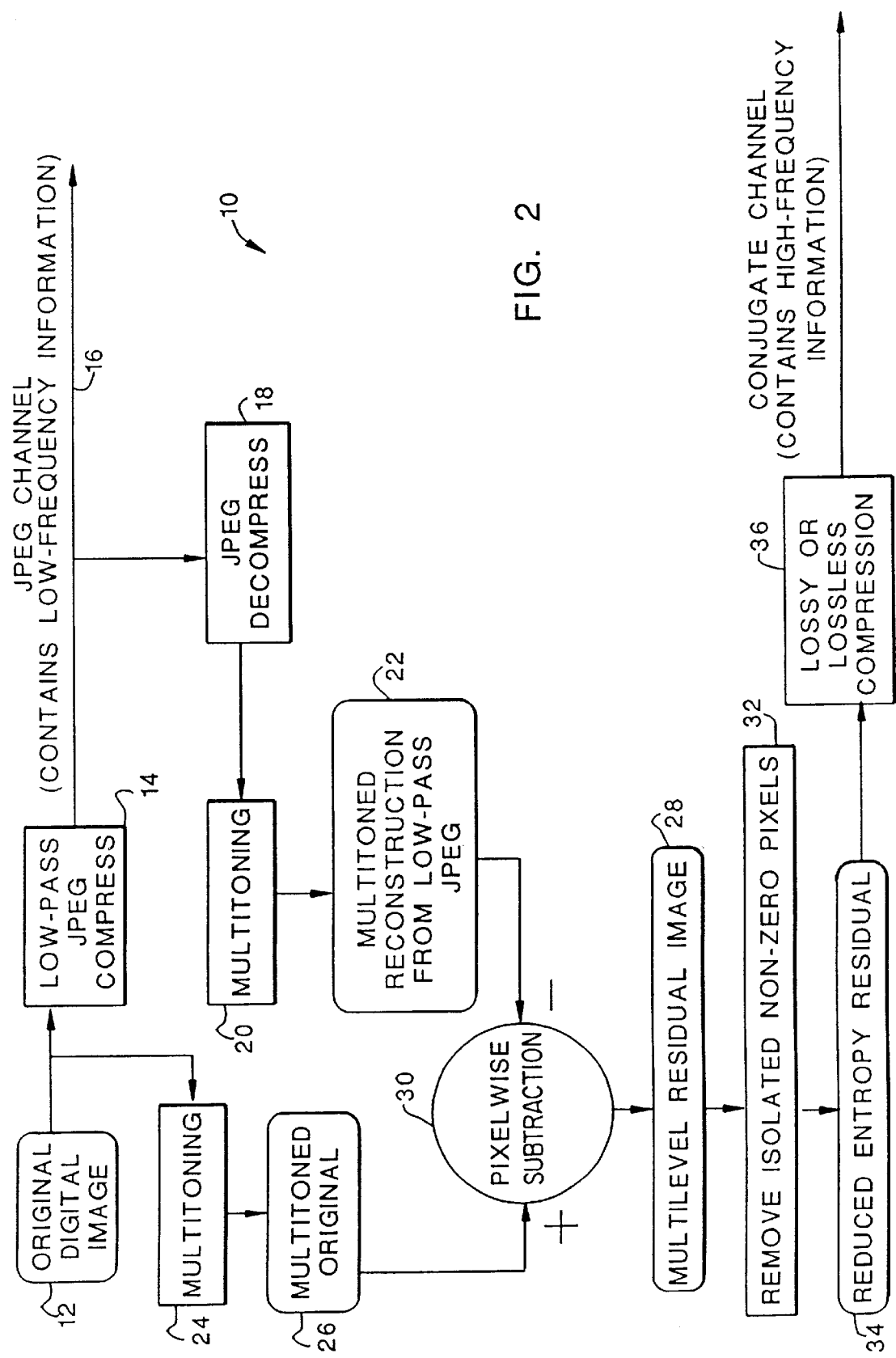
FIG. 2 is a schematic diagram of a conjugate channel transmitter according to the present invention.

Referring to FIG. 2, a conjugate channel transmitter 10 aggressively compresses an original continuous tone image 12, such as by JPEG, at 14, by using a smoothing filter to eliminate the high frequencies. The smoothing filter greatly increases the compression performance of the JPEG process. The resulting JPEG file is then transmitted over channel 16.

Within the transmitter, the JPEG file is decompressed at 18, and the decompressed file is multitoned by a predetermined method at 20 to form a multitoned reconstruction 22. Original digital image 12 is multitoned at 24 by the same predetermined method as used at 20 to form a multitoned original 26. A multilevel residual image 28 is computed at 30 by a pixel-wise subtraction of multitoned local reconstruction 22 from multitoned original image 26.

Figure 3:
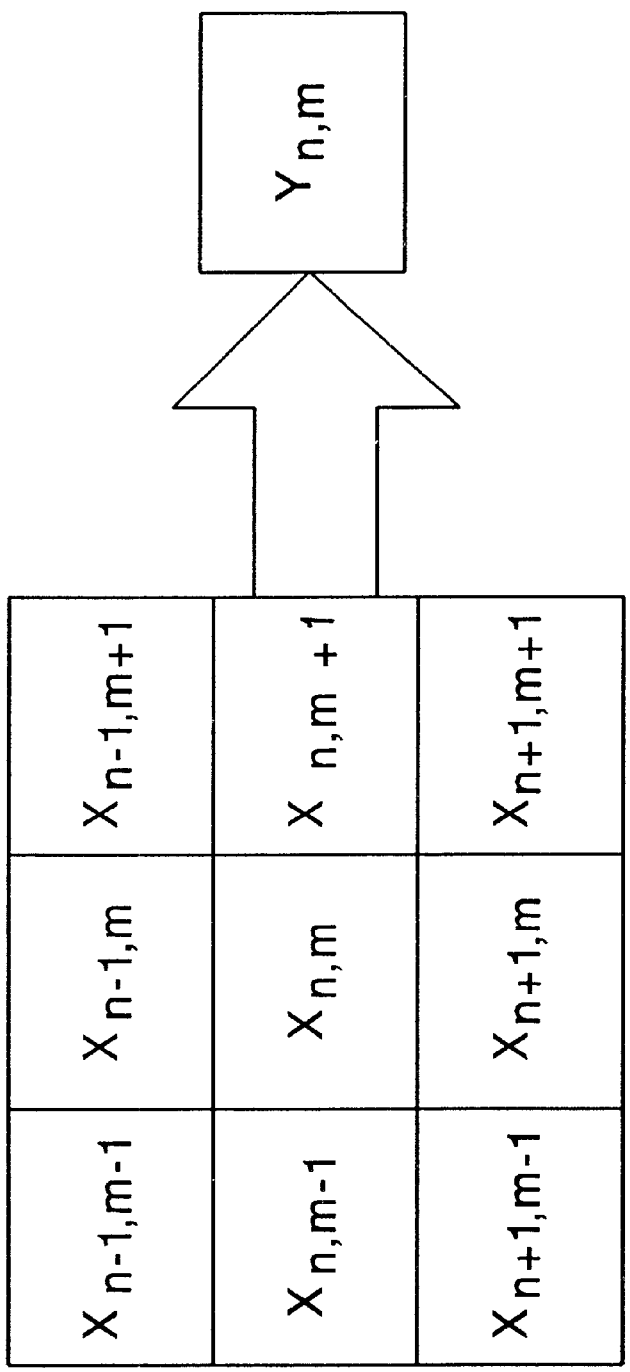
FIG. 3 is a schematic illustration of spatial filtering to eliminate isolated non-zero pixels.

Residual image 28 tends to have nonzero pixels only in the neighborhood of edges within the original image; with most of the pixels being of zero value. However, due to the multitoning process, a large number of isolated nonzero pixels will be dispersed randomly across the residual. Such pixels greatly increase the entropy of the residual, thereby decreasing the compressibility of the residual image, but they contribute little to the perceived quality of the final image. These pixels may be substantially eliminated at 32 to create a reduced entropy residual 34 such as shown in U.S. Pat. No. 5,359,430, which issued to S. Zhang on Oct. 25, 1994, or as shown in FIG. 3, in order to reduce the entropy of the residual. Alternatively, the isolated nonzero pixels could be eliminated by erosion followed by dilation, or by median filtering as described by Jain in "Fundamentals of Image Processing."

Reduced entropy residual image 34 is then encoded at 36 for transmission when a high quality reconstruction is desired at a receiver. The encoding of the residual image may be done by any convenient scheme, and may include lossy or lossless compression methods. The reduced entropy residual image will not otherwise be transmitted.

Figure 4:
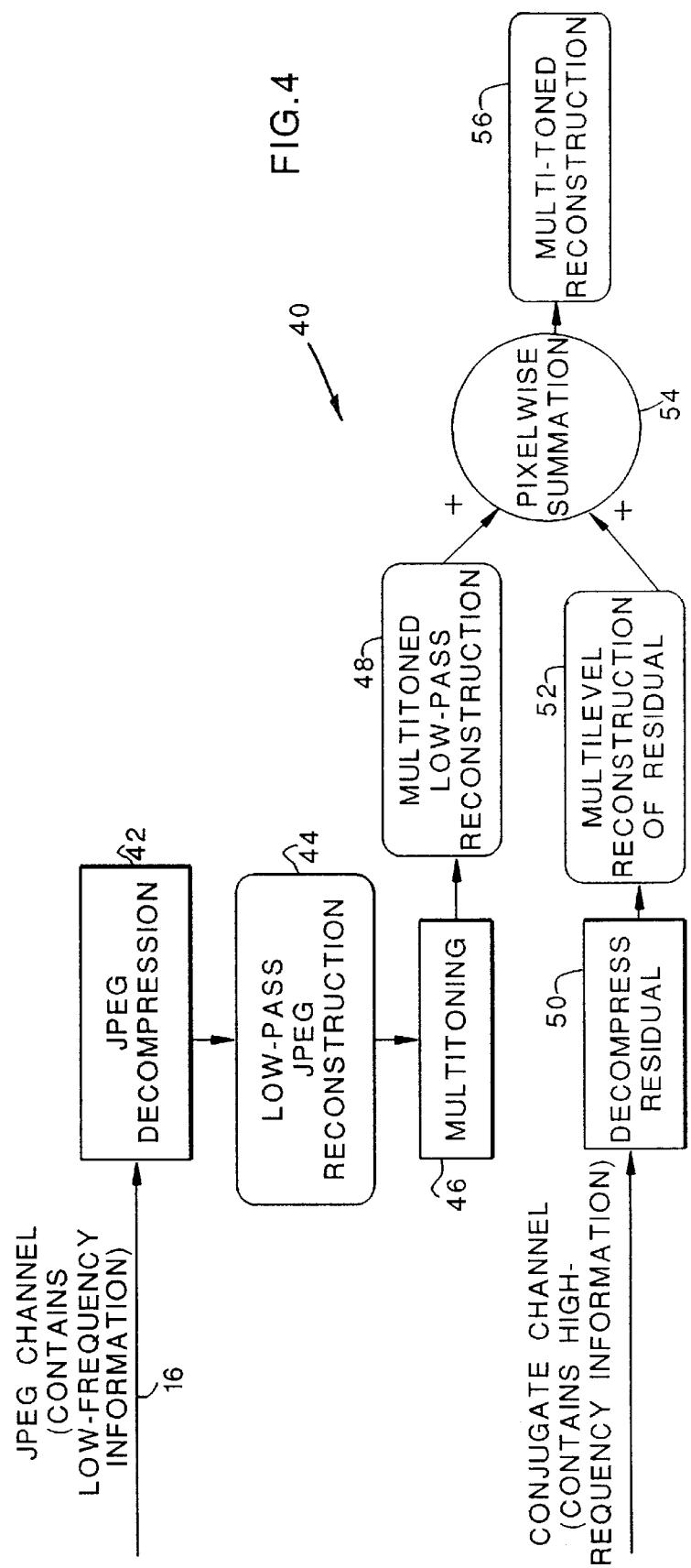
FIG. 4 is a schematic diagram of a conjugate channel receiver according to the present invention.

Referring to FIG. 4, a receiver 40 includes a JPEG decompression unit 42 which receives and decompresses the JPEG file, which was transmitted over channel 16, to produce a low-pass JPEG reconstruction 44. This reconstruction is multitoned at 46 to produce a multitoned low-pass reconstruction 48.

Reduced entropy residual image 34, which was encoded at 36 is received and decompressed at 50 to form a multi-level reconstruction of residual 52. A pixelwise summation 54 adds multitoned low-pass reconstruction 48 to multilevel reconstruction of residual 52 to generate a final reconstructed image 56. Thus, the reconstructed image will have approximately both the low frequency information and the high frequency information of the original image.

Figure 5:
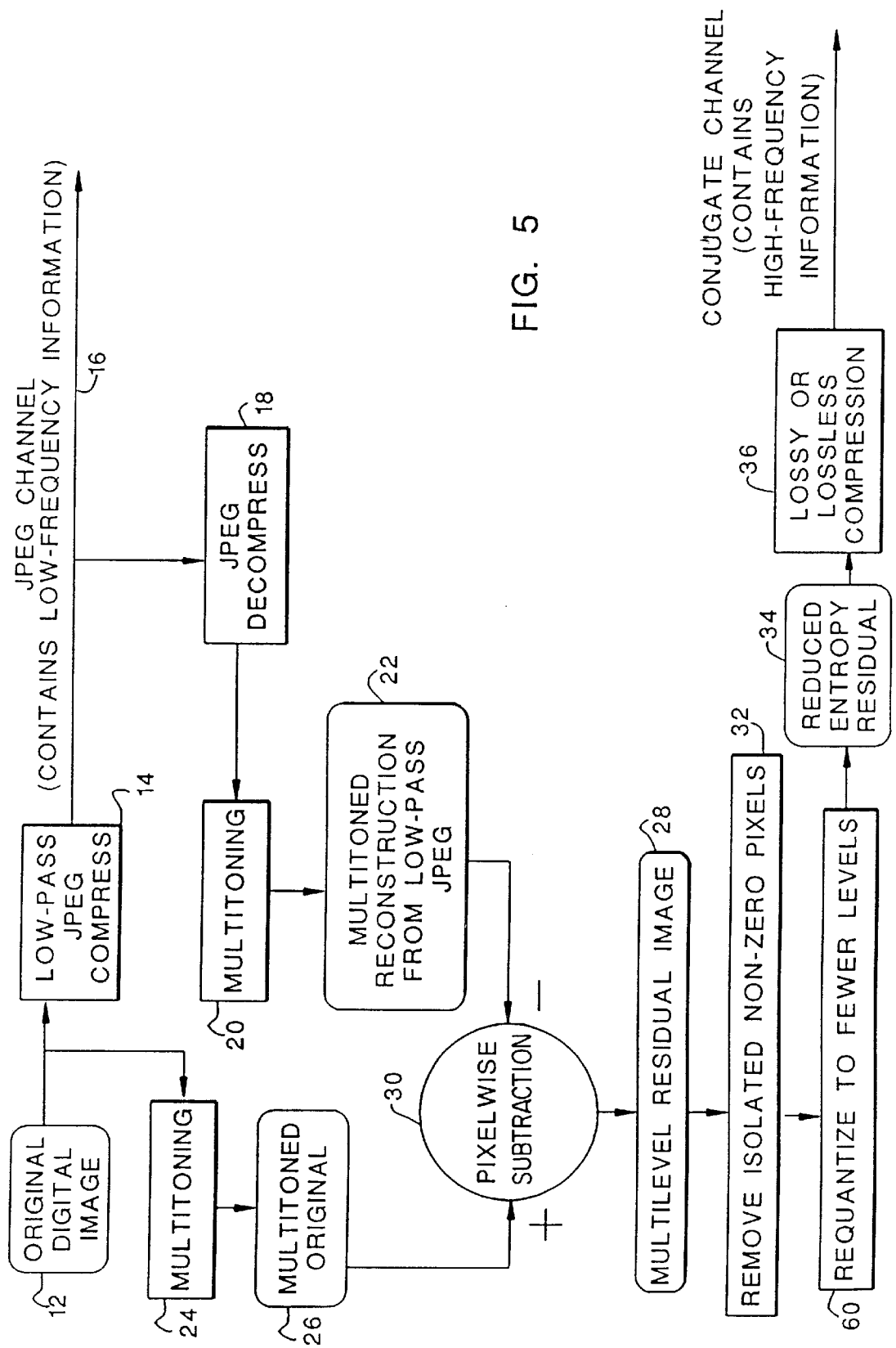
FIG. 5 is a diagram of a conjugate channel transmitter according to another embodiment of the present invention, with a re-quantized residual.
Figure 6:
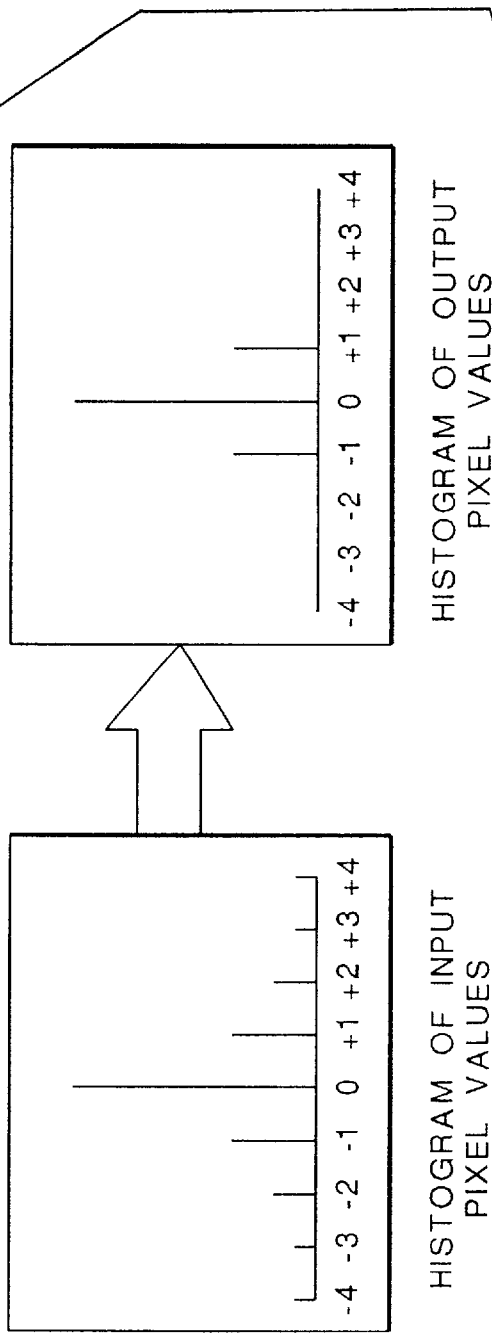
FIG. 6 is a schematic illustration of a residual re-quantizer for use with the transmitter of FIG. 5.
Figure 6:
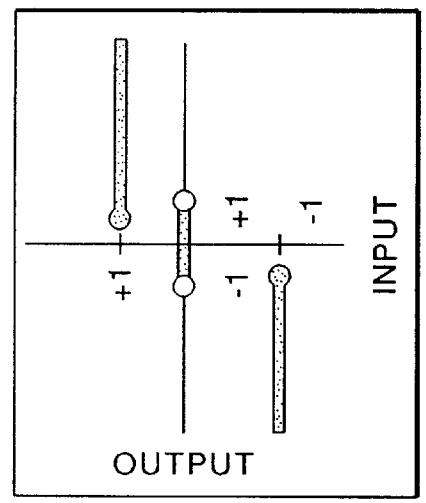

Referring back to FIG. 2, the pixels of resulting reduced entropy residual image 34 may be requantized to fewer levels by mapping to the values of {−1, 0, +1} as shown at 60 in FIG. 5 and as shown schematically in FIG. 6. This further reduces the entropy of the residual image; and greatly reduces the complexity of subsequent encoding and decoding steps without significantly degrading the final results.

Then, the residual image will be highly correlated (the −1 and the +1 pixels will tend to be in connected edges), and thus highly amenable to compression. This residual is implicitly quantized, making subsequent compression easier. Various compression schemes could be used, such as CCITT Group III or IV (which are optimized for transmitting edges, as occur in text and line drawings), DPCM as described by Jain and others, context-sensitive entropy coding as described by Rabbani and Jones, or by vector quantization as described by Allen Gersho and Robert M. Gray in "Vector Quantization and Signal Compression", Kluwer Academic Publishers of Boston, 1992.

The invention has been described in detail with particular reference to preferred embodiments thereof, but it will be understood that variations and modifications can be effected within the spirit and scope of the invention.

What is claimed is:

1. A process for the compression and transmission of an original image containing both low frequency information and high frequency information, the process comprising:

compressing the low frequency information;

transmitting the compressed low frequency information;

multitoning the compressed low frequency information to form a first multitoned reconstruction;

multitoning the original image to form a multitoned original;

calculating a residual signal as the difference between the multitoned original and the first multitoned reconstruction; and transmitting the residual signal.

2. The process set forth in claim 1 wherein the step of multitoning the low frequency information to form a the first multitoned reconstruction includes the step of decompressing the compressed low frequency information.

3. The process set forth in claim 1 wherein the low frequency information is compressed by lossless techniques.

4. The process set forth in claim 2 wherein the low frequency information is compressed by lossy techniques.

5. The process set forth in claim 1 wherein the original image and the low frequency information are multitoned by the same method.

6. The process set forth in claim 1 further comprising the step of filtering the residual signal to substantially eliminate isolated non-zero pixels, thereby reducing entropy of the residual signal.

7. The process set forth in claim 1 further comprising the steps of:

decompressing the transmitted compressed low frequency information to produce a reconstruction of the low frequency information;

multitoning the reconstruction of the low frequency information to generate a second multitoned reconstruction; and summing the second multitoned reconstruction of the low frequency information with the transmitted residual signal to produce a reconstruction of the original image.

8. The process set forth in claim 1 further comprising the step of requantizing the residual signal to a small set of values.

9. The process set forth in claim 1 further comprising the step of compressing the residual signal before transmitting it.

10. The process set forth in claim 9 further comprising the steps of:

decompressing the transmitted compressed low frequency information to produce a second reconstruction of the low frequency information;

multitoning the second reconstruction of the low frequency information to produce a second multitoned reconstruction;

decompressing the transmitted residual signal to produce a multilevel reconstruction of the residual signal; and summing the second multitoned reconstruction of the low frequency information with the multilevel reconstruction of the residual signal to produce a reconstruction of the original image.

* * * * *